No. 731,287. PATENTED JUNE 16, 1903.
F. H. DELKER.
SHIFTING RAIL FASTENER FOR VEHICLE TOPS.
APPLICATION FILED JAN. 12, 1903.
NO MODEL. 2 SHEETS—SHEET 1.
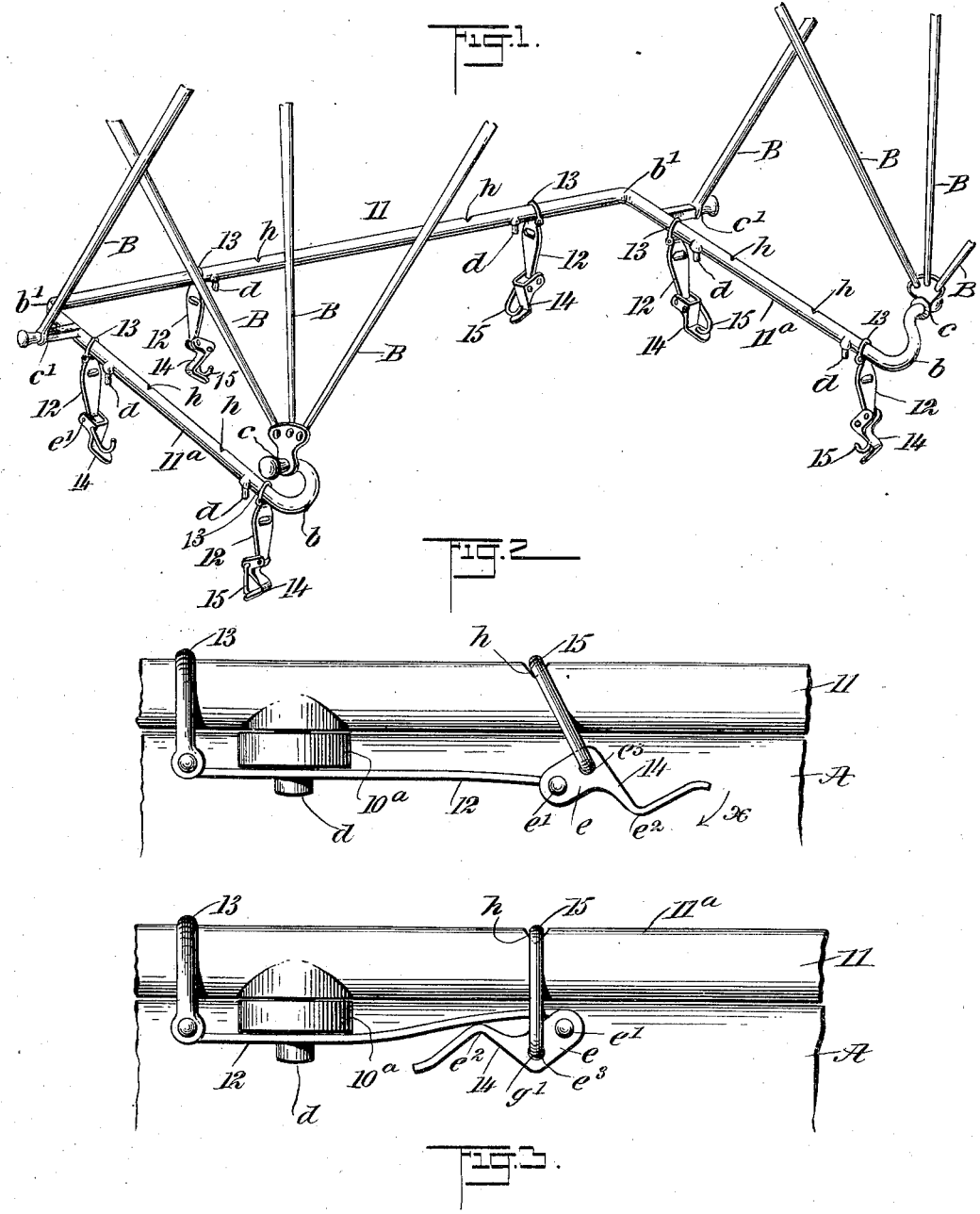
WITNESSES:
INVENTOR
Frank H. Delker
BY
ATTORNEYS.

No. 731,287. PATENTED JUNE 16, 1903.
F. H. DELKER.
SHIFTING RAIL FASTENER FOR VEHICLE TOPS.
APPLICATION FILED JAN. 12, 1903.
NO MODEL. 2 SHEETS—SHEET 2.
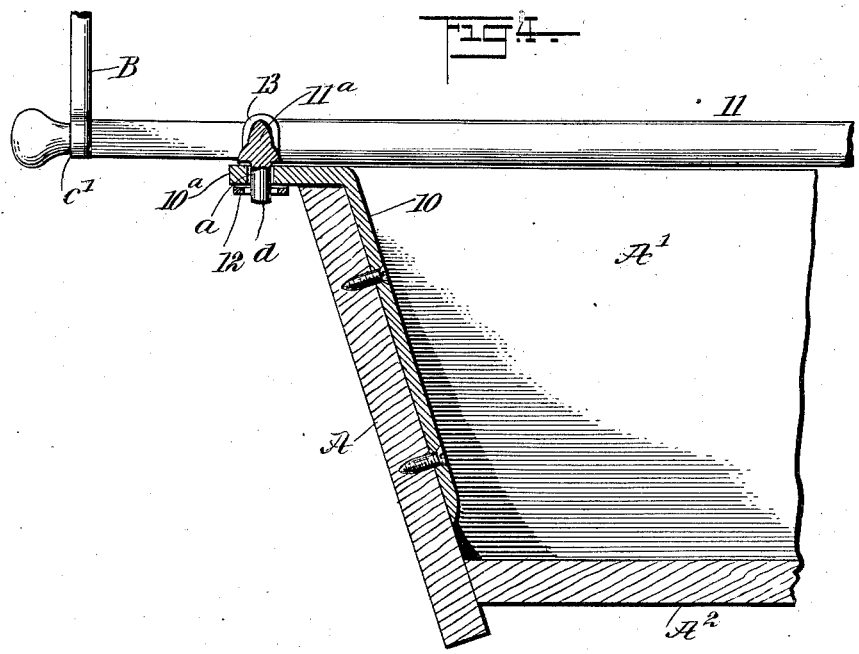
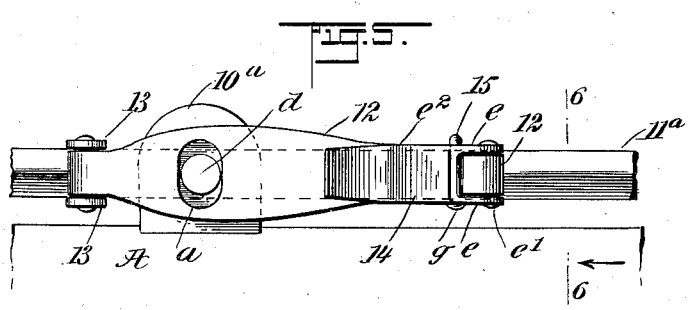
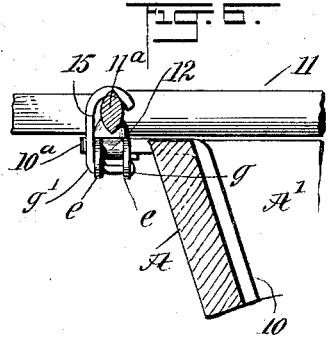
WITNESSES:
INVENTOR
Frank H. Delker
BY
ATTORNEYS.

No. 731,287. Patented June 16, 1903.

UNITED STATES PATENT OFFICE.

FRANK H. DELKER, OF HENDERSON, KENTUCKY.

SHIFTING-RAIL FASTENER FOR VEHICLE-TOPS.

SPECIFICATION forming part of Letters Patent No. 731,287, dated June 16, 1903.

Application filed January 12, 1903. Serial No. 138,743. (No model.)

*To all whom it may concern:*

Be it known that I, FRANK H. DELKER, a citizen of the United States, and a resident of Henderson, in the county of Henderson and State of Kentucky, have invented a new and Improved Shifting-Rail Fastener for Vehicle-Tops, of which the following is a full, clear, and exact description.

Ordinarily the means for attaching and removing the top covering of wheeled conveyances, such as buggies, requires time and the use of tools to effect the same.

The object of this invention is to provide simple novel means for the quick reliable connection of the shifting rail of a vehicle-top with the seat-irons or braces that are fixtures on the side and backboards of the vehicle-seat and likewise the convenient and speedy removal of the vehicle-top from the seat, as occasion may require.

The invention consists in the novel construction and combination of parts, as is hereinafter described, and defined in the appended claims.

Reference is to be had to the accompanying drawings, forming a part of this specification, in which similar characters of reference indicate corresponding parts in all the views.

Figure 1 is a perspective view of the lower portion of vehicle-top braces, a shifting rail, and a plurality of the improved rail-fasteners pendent from the shifting rail. Fig. 2 is an enlarged exterior view of a portion of one side board of a vehicle-seat, a portion of a shifting rail mounted thereon, and one of the improved rail-fasteners mounted on the rail and adjusted to permit said rail to be readily removed. Fig. 3 is a view corresponding in details with Fig. 2, but representing the parts adjusted for clamping the shifting rail upon the vehicle-seat. Fig. 4 is an enlarged transverse sectional view of a vehicle-seat in part, a seat-iron secured on the inner surface of the side wall of the seat, and a partly-sectional view of the shifting rail held in place on the seat-iron by a detail of the fastening device. Fig. 5 is a reverse plan view of the improved fastening device mounted upon a seat-iron and adjusted to clamp the shifting rail of a vehicle-top upon said seat-iron, and Fig. 6 is a transverse sectional view of details on the line 6 6 in Fig. 5.

The improvements are applicable to any style of vehicle-top mounted upon a shifting rail and may be utilized for the detachable connection of the shifting rail upon seats for light vehicles of various styles. As shown, to illustrate the application of the improvements the seat is of the ordinary box type, comprising two sides A, one being shown in Fig. 4, a back A', and a bottom A².

Upon the side A one of the braces or seat-irons 10 is shown secured upon the inner surface of said side, said brace or seat-iron having a member 10ª bent outward and resting upon the upper edge of the side A. As represented, the seat-iron member 10ª is perforated vertically at $a$ to receive a pendent pin on the shifting rail 11, and it is to be understood that any preferred number of seat-irons 10 may be employed and be secured at proper points on the inner surfaces of the sides A and back A' of the seat.

The shifting rail 11 consists of a metal bar bent at $b$ and $b'$, these bends affording two members 11ª of equal length, which may be disposed at a right angle to the main portion of the shifting rail and in service are imposed upon and removably secured to the upper edges of the sides A of the vehicle-seat, as will presently be described, said shifting rail having journal projections $c\ c'$, respectively, formed on the front and rear portions of the side members 11ª for the rockable support of the prop-bars B of the vehicle-top, as is clearly indicated in Fig. 1.

On the shifting rail 11 at suitable points a plurality of pins $d$ are formed or secured, said pins being respectively disposed above a seat-iron member 10ª, so as to be readily insertible down through the perforation $a$ therein, which will retain the shifting rail in place on the top surface of the sides and back A A', preventing side movement of the shifting rail, but permitting its vertical displacement.

The improved shifting-rail fastener consists of a series of similar clamps of novel construction, there being preferably one for each pin and seat-iron engaged therewith, and as said clamping devices are alike a description of one will answer for the series.

A spring plate or leaf 12, of suitable length, breadth, and tensional strength, is perforated near one end thereof, so as to receive loosely one of the depending pins $d$, and upon said end of the spring-leaf 12 the ends of the bowed clevis-loop 13 are pivoted, said clevis-loop being loosely mounted upon the shifting rail 11. On the opposite end of the spring-leaf 12 two spaced ears $e$, formed on one end of a lever 14, are pivoted near their free ends, as at $e'$, so that said ears will loosely embrace the side edges of the spring-leaf and the lever be held to rock thereon between the ears. From the ears $e$, at like side edges, the body of the lever 14 is projected nearly at a right angle to a point $e^2$, where a nearly right-angular bend is formed in the lever-body, whereby the main portion thereof is caused to trend away from the ears in a plane substantially parallel with said edges, as is clearly shown in Figs. 2 and 3. Near the pivot $e'$ the spaced ears $e$ are oppositely perforated, these perforations $e^3$ being located near the angular junction of the bent lever 14 with the ears $e$. In the opposite perforations $e^3$ the transverse member $g$ of a clamping-hook 15 is loosely secured, whereby the clamping-hook is held to rock on the lever 14.

The clamping-hook 15 is bent from a metal rod, first at $g'$ to provide the transverse member $g$ thereon, and near the opposite end the rod material is curved into hook form, this formation providing a hook that extends above the upper edge of the shifting rail 11, as is best shown in Fig. 6.

In the upper edge of the shifting rail 11, above each lever 14, a notch $h$ is formed, which will receive the curved member of each clamping-hook 15 when it is adjusted to effect such an engagement and prevent the hooks 15 from slipping along the engaged edge of the shifting rail. It will be seen in Fig. 2 that when the details of each clamping device are arranged for the release of the shifting rail 11 the main member of the clamping-lever 14 will be projected away from the spring-leaf 12, and the latter will without strain be supported nearly horizontal by its ends, so that, if desired, the clamping-hook 15 may be readily disengaged from the notch $h$ in the shifting rail 11 and be permitted to hang pendent therefrom after release of the spring-leaf from the depending pin $d$, as shown in Fig. 1.

Assuming that the shifting rail 11 is positioned on the upper edge of the vehicle-seat and the pins $d$ are respectively inserted through the perforations $a$ in the seat-iron members $10^a$, the shifting rail and attached vehicle-top may be secured in position by placing the hooks 15 over the shifting rail and then rocking each of the levers 14 into the position shown in Fig. 3.

To further explain the locking adjustment of each lever 14, it will be seen that upon manipulation of said lever so as to turn its free end toward the pin $d$, as is indicated by the curved arrow $x$ in Fig. 2, the hook 15 will be drawn upon by the eccentric disposal of the point of pivotal connection $g$ and the adjacent end of the spring leaf 12 will be strained toward the shifting bar 11 a corresponding degree.

Owing to the stress of the spring-leaf 12, the lever 14 will be forced toward and into contact with the lower surface of said spring-leaf at its angular bend $e^2$ and the main portion of the lever will be inclined downward and toward the pin $d$.

Obviously the tension of the spring-leaves 12 and the eccentric action of each lever 14 when the clamping devices are severally adjusted as shown in Fig. 3 will serve to hold the shifting rail 11 firmly clamped upon the seat-walls A A' and, furthermore, that the stress of said spring-leaves will hold the levers from an accidental rocking movement, take up wear of working parts, and prevent rattling of said parts while in service and the vehicle is in rapid motion.

It will be evident that the length of leverage afforded to the clamping-levers 14 enables their manual adjustment with but slight exertion and effects a very reliable attachment of the fastening devices upon the rail, so that the vehicle-top may be very conveniently secured in place or removed, which is a matter of great advantage, as it permits the ready conversion of an uncovered vehicle into a covered one in a few moments by any one who can lift the vehicle-top; furthermore, the fasteners for the shifting rail are all mounted thereon and loosely secured thereto, so that there are no unsightly parts left exposed on the vehicle-seat when the top and shifting rail are removed. The fastening devices are quite small and may be finished so as to be ornamental and not mar the appearance of the vehicle-seat when in place thereon.

Having thus described my invention, I claim as new and desire to secure by Letters Patent—

1. A fastener for the shifting rails of vehicle-seats, comprising a seat-iron, a spring-leaf engaging the seat-iron, means for loosely coupling one end of the spring-leaf with the shifting rail, and detachable means for connecting the opposite end of said spring-leaf with the shifting rail.

2. A fastener for the shifting rails of vehicle-seats, comprising a pin depending from the shifting rail and loosely engaging a lateral member on a seat-iron, a spring-leaf bearing on the seat-iron member and through which the lower end of the pin passes, a loose connection between one end of the spring-leaf and the shifting rail, a hook loosely engaging the shifting rail, and a lever eccentrically connecting the other end of the spring-leaf with the hook.

3. A fastener for the shifting rails of vehicle-seats, comprising a pin depending from the shifting rail and loosely passing through a perforation in a lateral member on a seat-iron, a spring-leaf having a perforation through which the lower end of the pin passes, a loose connection between one end of the spring-leaf and the shifting rail, a hook loosely engaging the shifting rail, a bent lever, two spaced flanges on one end of said lever, between which the other end of the spring-leaf is pivoted, the lower end of said hook having an eccentric pivot connection with the flanged end of the lever.

4. The combination with a vehicle-seat, and brace-irons thereon, each iron having a laterally-bent and perforated top member, of a shifting rail which supports a vehicle-top, pins depending from the shifting rail and loosely passing through the perforations in the brace-iron members, spring-leaves loosely secured by one end of each on the shifting rail, and perforated to receive the lower ends of the pins, a hook for each spring-leaf, removably engaging the shifting rail, and a bent lever for each hook, having two spaced flanges on one end between which the remaining end of a respective spring is pivoted, the lower ends of the hooks being pivoted on the flanges, eccentrically to the pivot connections of the spring-leaves thereon.

5. A fastener for a shifting rail on a vehicle-seat, comprising a shifting rail, a seat, a pin-and-socket connection between the rail and the seat, a spring-leaf coupled at one end with the rail, a hook loosely engaging the rail and spaced from the coupling device, and a lever pivoted on the end of the spring-leaf opposite the coupled end thereof, and also pivoted on the hook eccentrically to the pivot connecting the spring-leaf and lever.

In testimony whereof I have signed my name to this specification in the presence of two subscribing witnesses.

FRANK H. DELKER.

Witnesses:
JOHN EDWARD EVANS,
ROBERT G. WHITLEDGE.